United States Patent [19]
Murakami et al.

[11] Patent Number: 5,480,361
[45] Date of Patent: Jan. 2, 1996

[54] CHANGE DIRECTION PLANETARY GEARING FOR CONTINUOUSLY VARIABLE TRANSMISSION

[75] Inventors: Yoshiyasu Murakami, Nagoya; Hirofumi Okahara; Akito Suzuki, both of Isehara; Tsuyoshi Maeda, Atsugi, all of Japan

[73] Assignees: Nissan Motor Co., Ltd., Yokohama; Aichi Machine Industry Co., Ltd., Nagoya, both of Japan

[21] Appl. No.: 187,286

[22] Filed: Jan. 27, 1994

[30] Foreign Application Priority Data

Jan. 27, 1993 [JP] Japan ................. 5-031333

[51] Int. Cl.[6] .................. F16H 1/36; F16H 11/06
[52] U.S. Cl. .............................. 475/328
[58] Field of Search .................. 475/326, 327, 475/328

[56] References Cited

U.S. PATENT DOCUMENTS 2,757,558 8/1956 Stoeckicht .................. 475/328

FOREIGN PATENT DOCUMENTS 61-105353 5/1986 Japan.
3-204436 9/1991 Japan.

Primary Examiner—Dirk Wright
Attorney, Agent, or Firm—Foley & Lardner

[57] ABSTRACT

A space-saving compart change direction planetary gearing includes a reverse brake, a forward clutch and a planetary gear set. The brake includes a cylindrical portion integral with a pinion carrier of the planetary gear set. The clutch drum and planetary gear set including pinions carried by the pinion carrier are received in the cylindrical portion. In mounting the component parts within a casing, a brake piston is inserted into the casing. Then, an assembly of the clutch, planetary gear set including the pinion carrier integral with the cylindrical portion and an input shaft is inserted into the casing. Then, a brake frictional plate assembly is engaged between the cylindrical portion and a cylindrical inner wall of the casing.

11 Claims, 4 Drawing Sheets

CHANGE DIRECTION PLANETARY GEARING FOR CONTINUOUSLY VARIABLE TRANSMISSION

BACKGROUND OF THE INVENTION

The present invention relates to a change direction planetary gearing, and more particularly to a change direction planetary gearing for use in a continuously variable transmission.

U.S. Pat. No. 4,735,113, Yamamuro et al., issued on Apr. 5, 1988, discloses a continuously variable transmission. According to this known continuously variable transmission, a forward reverse change-over mechanism or a change direction planetary gearing is disposed between a hydrokinetic unit and a continuously variable ratio change unit. The hydrokinetic unit is in the form of a fluid coupling including a pump impeller and a turbine runner rotatable with a turbine shaft, while the continuously variable ratio change unit includes a driver pulley mounted to a driver shaft, a follower pulley mounted to a follower shaft, and a power transmission endless member (V-belt) interconnecting the two pulleys. The turbine shaft is coaxially aligned with the driver shaft. The turbine and driver shafts are regarded as input and output shafts, respectively, of the change direction planetary gearing. The change direction planetary gearing comprises a reverse brake, a forward clutch and a planetary gear set. The input shaft is rotatable with a sun gear. The planetary gear set includes, in addition to the sun gear, a pinion carrier connected to the output shaft, and a ring gear. The pinion carrier rotatably carries a plurality pairs of intermeshed pinions, each pair meshing and disposed between the sun and ring gears. The forward clutch includes a clutch drum connected to the input shaft, a cylindrical portion integral with a hub connected to the pinion carrier, and interleaved driver and driven frictional plates connected between the clutch drum and cylindrical portion. The reverse brake includes a cylindrical portion rotatable with the ring gear and interleaved driver and driven frictional plates connected between this cylindrical portion and a stationary casing. For forward drive, the forward clutch is engaged with the reverse brake released. Engagement of the forward clutch causes the pinion carrier to rotate with the sun gear, causing the output shaft to rotate with the input shaft in the same forward direction. For reverse drive, the forward clutch is disengaged and the reverse brake is applied. The ring is anchored and thus held stationary with respect to the casing. Thus, rotation of the sun gear in the forward direction causes the pinion carrier and thus the output shaft to rotate in the opposite or reverse direction. In this mode of operation, the clutch drum engaging the driver frictional plate rotates in the forward direction, while the cylindrical portion engaging the mating driven frictional plates rotates in the reverse direction. According to this known change direction planetary gearing, a skilled labour is required to complete assembly of the reverse brake since the interleaved frictional plates of the brake are disposed deeply inside the casing and behind the clutch drum.

An object of the present invention is to improve a planetary gearing of the above kind such that no skilled labour is required in mounting the component parts within the casing.

SUMMARY OF THE INVENTION

The present invention provides a planetary gearing, comprising:

a casing;

a brake including a cylindrical portion;

a clutch including a clutch drum received in said cylindrical portion; and a planetary gear set received in said cylindrical portion and connected between said clutch drum and said cylindrical portion.

Further, the present invention provides a planetary gearing, comprising:

a casing;

a brake including a cylindrical portion;

an output shaft rotatably supported by said casing;

a clutch including a clutch drum received in said cylindrical portion;

an input shaft connected to said clutch drum; and a planetary gear set received in said cylindrical portion, said planetary gear set including a ring gear connected to said clutch drum, a sun gear connected to said output shaft, and a pinion carrier, said pinion carrier being integral with said cylindrical portion.

Further, the present invention provides a planetary gearing, comprising:

a casing;

an output shaft rotatably supported by said casing;

a brake including a cylindrical portion;

a clutch including a clutch drum and a cylindrical portion disposed within said clutch drum;

an input shaft connected to said clutch drum;

a planetary gear set including a ring gear connected to said clutch drum, a sun gear connected to said output shaft, and a pinion carrier integral with said cylindrical portion of said brake; and a hub connected to said sun gear and integral with said cylindrical portion of said clutch, said hub defining on one side adjacent to said pinion carrier a radially extending clearance space and on the opposite side a second space within said clutch drum;

said sun gear including means for defining a radial passage having radially outward end opening to said radially etching clearance space.

DETAILED DESCRIPTION OF THE INVENTION

Figure 1:
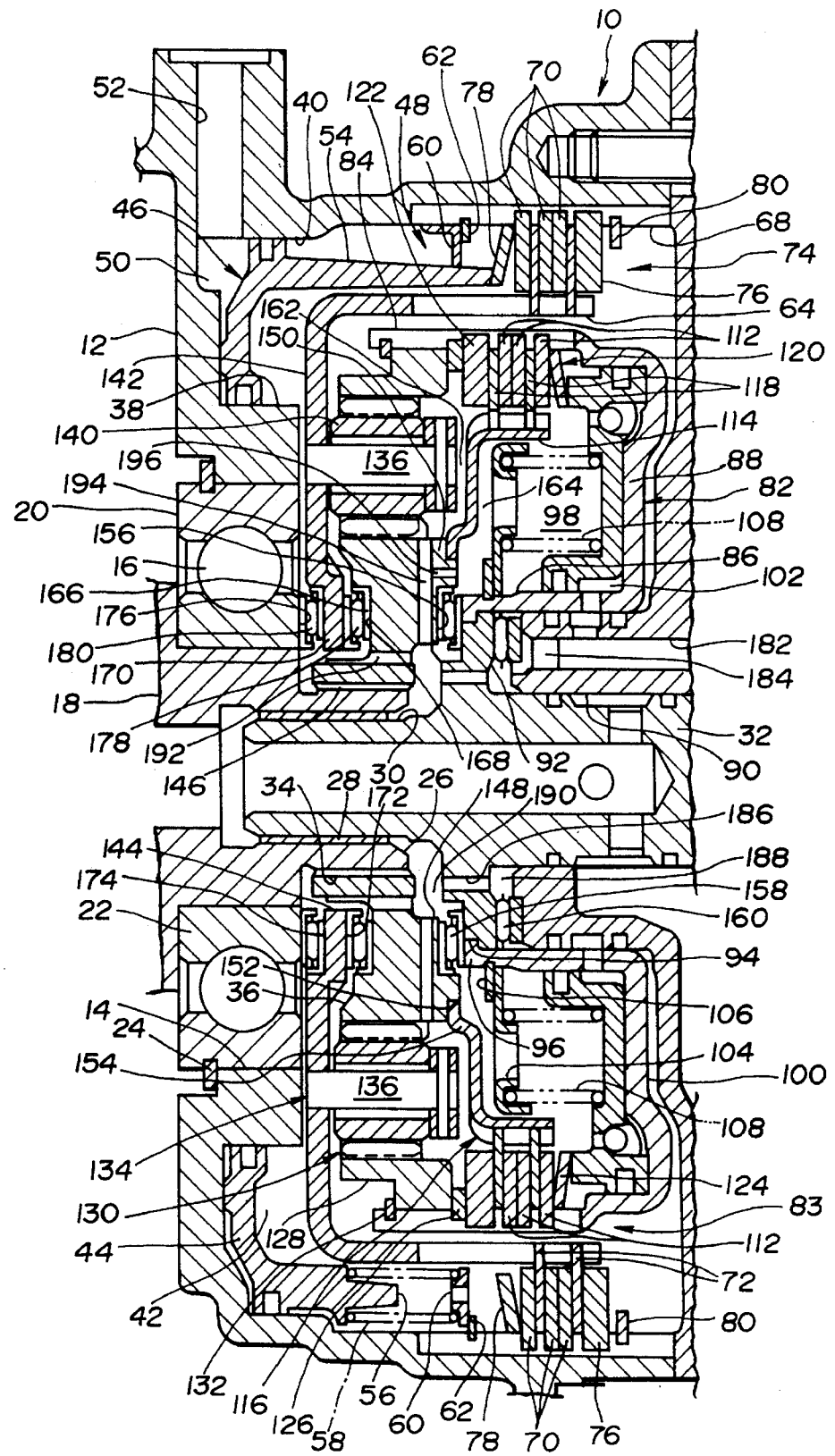
FIG. 1 is a fragmentary sectional view of a continuously variable transmission, showing a preferred embodiment of a planetary gearing according to the present invention.
Figure 2:
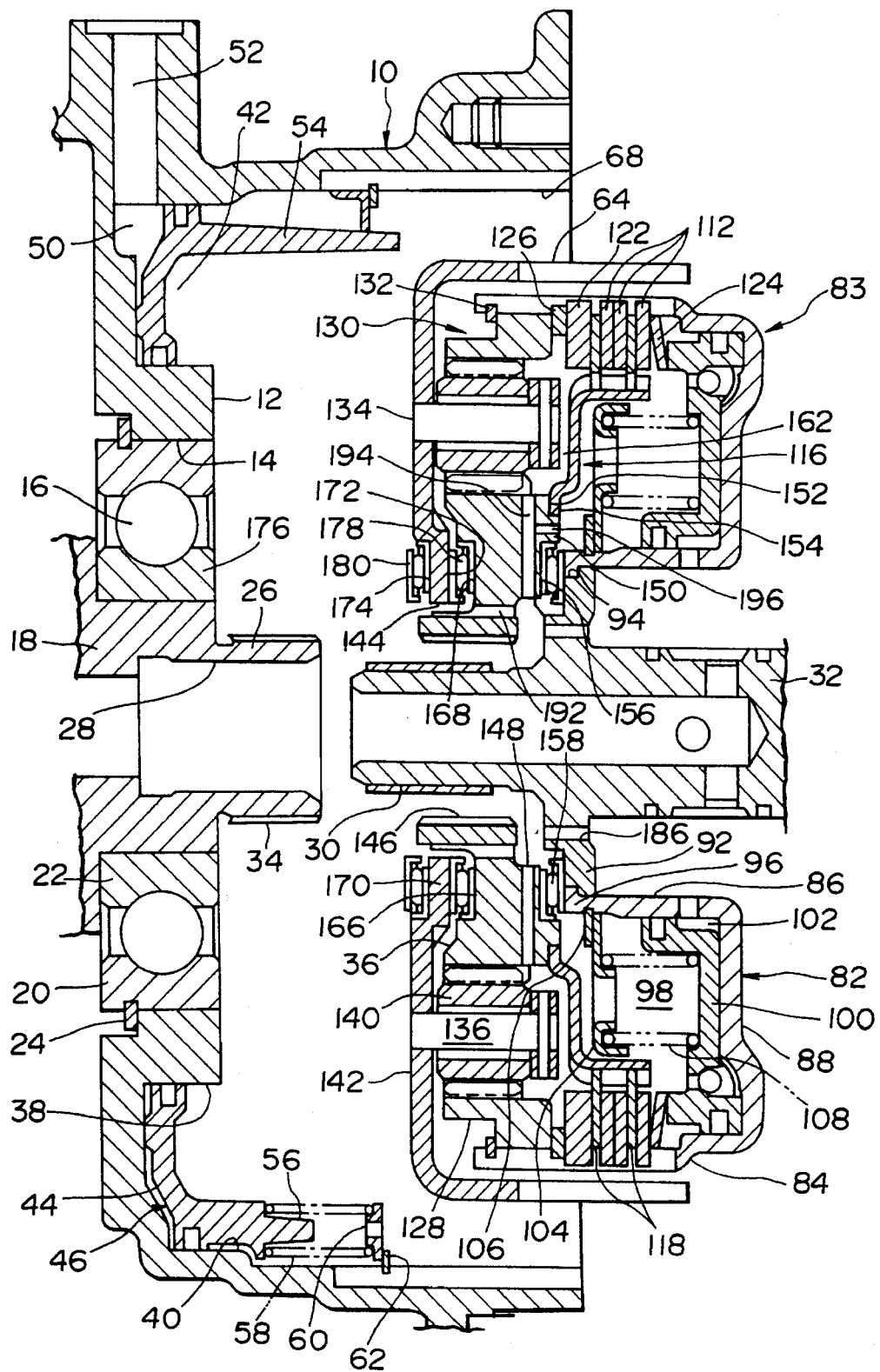
FIG. 2 is an exploded view of the planetary gearing.

Referring to FIG. 1, there is shown a casing 10. The casing 10 includes a partition 12 formed with a ball bearing receiving bore 14. Received in this bore 14 is a ball bearing 16 rotatably supporting an output shaft 18. The ball bearing 16 includes an outer race 20 and an inner race 22. The outer race 20 is in engagement with the bore 14 defining wall and held in position within the bore 14 by means of a snap ring 24 in the conventional manner. The inner race 22 is in engagement with the output shaft 18 in the conventional manner. As viewed in FIG. 1, the output shaft 18 includes a central boss 26 projecting from the righthand axial end thereof. The central boss 26 is formed with a bore 28 for rotatably receiving a reduced diameter end portion 30 of an input shaft 32. As best seen in FIG. 2, the central boss 26 is externally splined at 34 for spline connection with a sun gear 36.

The partition 12 is recessed at a portion radially outwardly spaced from the ball bearing receiving bore 14 to define a cylindrical shoulder 38 and a cylindrical inner wall portion 40. The cylindrical inner wall portion 40 is radially spaced from the cylindrical shoulder 38 to define an annular bore 42 therebetween. Received in this annular bore 42 is an annular disc portion 44 of a piston 46 of a reverse brake 48. The annular disc portion 44 has an outer periphery in seal-tight engagement with the cylindrical inner wall portion 40 and an inner periphery in seal-tight engagement with the cylindrical shoulder 38, and defines within the annular bore 42 a brake servo chamber 50. Communicating with this servo chamber 50 is a supply passage 52 drilled through the casing 10. The piston 46 includes, in addition to the annular disc portion 44, a plurality of angularly spaced arm portions, only one being shown at 54 in FIGS. 1 and 2, and a plurality of angularly spaced spring retainer boss portions, only one being shown at 56 in FIGS. 1 and 2. The arm portions 54 and spring retainer boss portions 56 are alternatively arranged along the outer periphery of the annular disc portion 44 and projects in parallel and in a direction away from the partition 12. The arm portions 54 extend further than the spring retainer boss portions 56 do. The reverse brake 48 also includes a plurality of return springs, only one being shown at 58 in FIGS. 1 and 2, and a return spring retainer 60 fixedly mounted to the casing 10 by means of a snap ring 62. The return springs 58 are disposed between the return spring retainer 60 and the corresponding spring retainer boss portions 56 to bias the piston 46 towards a spring set position thereof as illustrated in FIG. 1.

As shown in FIG. 1, the reverse brake 48 includes a cylindrical portion 64. The cylindrical portion 64 is disposed radially inwardly with respect to the arm portions 54 of the piston 46 and radially opposed to a cylindrical inner wall portion 68 defined by the casing 10. This cylindrical inner wall portion 68 is splined to engage a plurality of driven frictional plates 70 by spline connection. The cylindrical portion 64 is splined to engage a plurality of driver frictional plates 72. The driver and driven frictional plates 70 and 72 are interleaved to form a reverse brake frictional plate assembly 74. The reverse brake frictional plate assembly 74 includes, in addition to the driver and driven frictional plates 70 and 72, a retaining plate 76 and a dish plate 78. The retaining plate 76 is spline connected to the cylindrical inner wall portion 68 and held by a snap ring 80. The dish plate 78 is disposed between the leading ends of the arm portions 54 and the adjacent one driven frictional plate 70.

Received in the cylindrical portion 64 is a clutch drum 82 of a forward clutch 83. The clutch drum 82 includes an outer cylindrical portion 84, an inner cylindrical portion 86 and an annular end portion 88 interconnecting the outer and inner cylindrical portions 84 and 86. The inner cylindrical portion 86 is coaxially arranged with respect to the input shaft 32. The input shaft 32 extends through a stationary sleeve 90 and has a radially protruded portion 92. The radially protruded portion 92 is axially spaced from the adjacent axial end of the stationary sleeve 90. The radially protruded portion 92 is formed with a cutout 94 to receive a flange portion 96 extending radially inwardly from the axial end of the inner cylindrical portion 86. The clutch drum 82 is fixedly connected to the input shaft 32 for rotation therewith by welding the inner cylindrical portion 86 to the radially protruded portion 92.

Defined by the outer and inner cylindrical portions 84 and 86 and annular end portion 88 is an annular bore 98 slidably receiving an annular clutch piston 100. The clutch piston 100 has an outer periphery in seal-tight engagement with the outer cylindrical portion 84 and an inner periphery in seal-tight engagement with the inner cylindrical portion 86, and defines within the annular bore 98 a clutch servo chamber 102. A return spring retainer 104 is coupled with the inner cylindrical portion 86 and held by a snap ring 106. A plurality of return springs 108 are disposed between the return spring retainer 104 and the clutch piston 100 to bias the piston 100 towards a spring set position thereof as illustrated in FIG. 1.

The outer cylindrical portion 84 is splined axially inwardly from the leading end thereof to engage externally splined driver frictional plates 112 by spline connection. Disposed radially inwardly of the outer cylindrical portion 84 is a cylindrical portion 114 of a hub 116. The cylindrical portion 114 is splined to engage a plurality of driven frictional plates 118 by spline connection. The driver and driven frictional plates 112 and 118 are interleaved to form a forward clutch frictional plate assembly 120. The forward clutch frictional plate assembly 120 includes, in addition to the driver and driven frictional plates 112 and 118, a retaining plate 122 and a dish plate 124. The retaining plate 122 is spline connected to the outer cylindrical portion 84 and held by a snap ring 126. The dish plate 124 is disposed between the clutch piston 100 and the adjacent one of the driver frictional plates 112.

An internally toothed ring gear 128 of a planetary gear set 130 is externally splined to engage the outer cylindrical portion 84 by spline connection. The ring gear 128 is axially fit to the outer cylindrical portion 84 by a snap ring 132.

The planetary gear set 130 includes, in addition to the sun and ring gears 36 and 128, a pinion carrier 134. The pinion carrier 134 includes a plurality of pinion shafts or spindles 136 and a plurality of pinions 140 rotatably carried by the plurality of spindles 136, respectively. Each of the plurality of pinions 140 meshes the sun and ring gears 36 and 128. All of the spindles 136 are fixedly mounted to a radially extending annular disc portion 142. This annular disc portion 142 has an outer periphery integrally connected to the cylindrical portion 64 and an inner periphery 144. The annular disc portion 142 merges smoothly into the cylindrical portion 64.

As will be readily seen from FIGS. 1 and 2, the planetary gear set 130 is received in the cylindrical portion 64 and has its ring gear 128 connected to the clutch drum 82 and its pinion carrier 134 connected to the cylindrical portion 64.

As mentioned before, the central boss 28 is spline connected to the sun gear 36. For spline connection to the central boss 26, the sun gear 36 is formed with a splined bore 146 engaging the central boss 26 and an enlarged bore 148 surrounding the reduced diameter end portion 30 of the input shaft 32. The sun gear 36 includes an axially protruding portion 150 defining the enlarged bore 148. The axially protruding portion 150 is formed with an outer peripheral cutout 152 receiving an inner peripheral portion 154 of the hub 116. The axially protruding portion 150 is formed with an inner peripheral cutout 156 receiving a thrust bearing 158. The thrust bearing 158 is disposed between and in rolling contact with the radially protruded portion 92 of the input shaft 32 and the sun gear 36. Disposed between the radially protruded portion 92 and the stationary sleeve 90 is a thrsut bearing 160.

The hub 116, fixedly connected to the sun gear 36 and integral with the cylindrical portion 114, extends in such a manner as to define on the lefthand side, viewing in FIG. 1, adjacent to the pinions 140 a radially extending clearance space 162. On the opposite righthand side, viewing in FIG. 1, the hub 116 defines a space 164 within the clutch drum 82.

As shown in FIG. 1, the radially extending annular disc portion 142 of the pinion carrier 134 is interposed between the ball bearing inner race 22 and the sun gear 36. The sun gear 36 is formed with a recessed portion 166 and includes a radially extending bottom wall 168 partially defining the recessed portion 166. The radially extending annular disc portion 142 is offset at a portion radially spaced from the inner periphery 144 thereof to form an axially displaced inner peripheral portion 170. The axially displaced inner peripheral portion 170 defines on the righthand side, viewing in FIG. 1, a first radially extending wall 172 opposed to the radially extending bottom wall 168 of the recessed portion 166. On the opposite lefthand side, the axially displaced inner peripheral portion 170 defines a second radially extending wall 174 opposed to a radially extending wall 176 of the ball bearing inner race 22. Two thrust bearings, namely a first thrust bearing 178 and a second thrust bearing 180, are so disposed as to prevent mechanical interference between the radially extending annular disc portion 142, partition 12 of the casing 10 and sun gear 36.

Specifically, the first thrust bearing 178 is disposed between and in rolling contact with the radially extending bottom wall 168 and the radially extending wall 172 of the axially displaced inner peripheral portion 170, while the second thrust bearing 180 is disposed between and in rolling contact with the radially extending wall 174 of the axially displaced inner peripheral portion 170 and the radially extending wall 176 of the ball bearing inner race 22.

It should be noted that the recessed portion 166 and the axially displaced inner peripheral portion 170 allow compact arrangement of the thrust bearings 178 and 180 with a clearance between the partition 12 and the radially extending annular disc portion 142 kept minumum. This arrangement contributes much to reduction in axial span or dimension, with respect to the axis of the input shaft 32, of the planetary gearing.

Lubrication system for the planetary gearing is now described. The stationary sleeve 90 is formed with a lubrication oil supply passage 182 which is supplied with lubrication oil under pressure. This supply passage 182 is provided with an outlet orifice 184 at a location adjacent to the thrust bearing 160. The radially protruded portion 92 of the input shaft 32 is formed with a plurality of angularly spaced axial lubrication oil passages 186. These axial passages 186 establish fluid communication between an annular space 188 defined between the radially protruded portion 92 and the stationary sleeve 90 and an annular chamber 190 defined within the enlarged bore 148. The sun gear 36 is formed with a plurality of axial lubrication oil passages 192. Each of the axial passages 192 has one end opening to the annular chamber 190 and the opposite end opening within the radially extending bottom wall 168 of the recessed portion 166 of the sun gear 36. Via these lubrication oil passasges 186 and 192, the thrust bearings 158, 178 and 180 are supplied with lubrication oil. The thrust bearing 160 is supplied with lubrication oil at a portion immediately downstream of the orifice 184 of the supply passage 182.

The axially protruding portion 150 of the sun gear 36 is formed with a plurality of radial oil lubrication passages 194. Each of the radial passages 194 has a radially inward inlet end opening to the annular chamber 190 and a radially outward outlet end opening to the radially extending clearance space 162. With these radial passages 194, lubrication oil is thrown radially outwardly towards the clutch frictional plate assembly 120 during rotation of the input shaft 32. This lubrication passage arrangement assures sufficient supply of lubrication oil to the clutch frictional plate assembly 120.

In order to assure sufficient supply of lubrication oil to the space 164 within the clutch drum 82, a plurality of axial ports 196 are drilled through the axially protruding portion 150 of the sun gear 36. These axial ports 196 establish fluid communication at least some of the plurality of radial passages 194 and the space 164 within the clutch drum 82.

Figure 3:
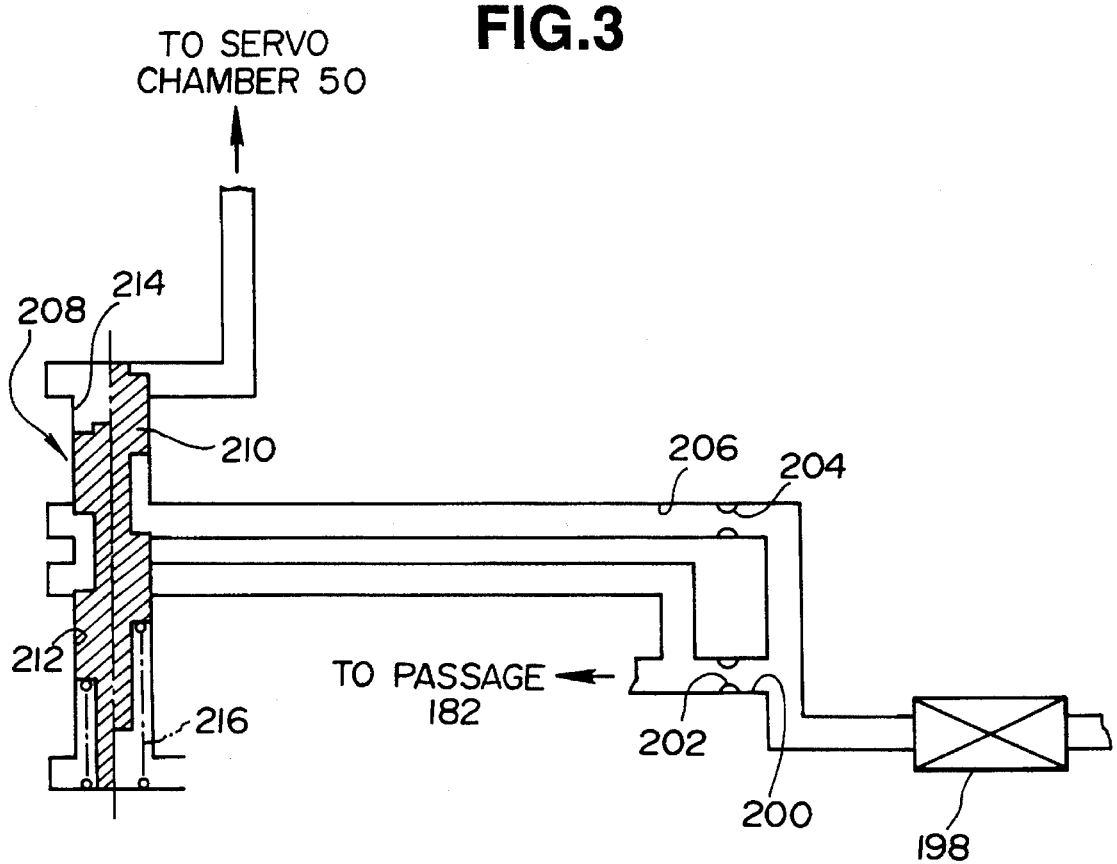
FIG. 3 is a fragmentary diagram of a lubriction system.

Referring to FIG. 3, there is shown a preferred lubrication control system for the planetary gearing shown in FIG. 1. This system is so designed as to increase the supply of lubrication oil to the planetary gearing during reverse drive when the reverse brake 48 is applied with the forward clutch 83 disengaged.

Lubrication oil is supplied to an oil cooler 198 and kept at a constant pressure in the same manner as disclosed in U.S. Pat. No. 4,735,113 issued to Yamamuro et al. on Apr. 5, 1988, which Patent is hereby incorporated by reference in its entirety. Particularly, reference is made to FIGS. 1A and 1B and the corresponding descriptive part in column 12, lines 30 to 44.

For the sake of simplicity, only a portion of the lubrication system communicating with the oil supply passage 182 is shown in FIG. 3. Referring to FIG. 3, the oil supply passage 182 is fluidly connected to the oil cooler 198 via a main passage 200 provided with a main orifice 202. In parallel to this main orifice 202, an auxiliary orifice 204 is provided in a bypass passage 206. A two-position bypass valve 208 is fluidly disposed in the bypass passage 206 between the auxiliary orifice 204 and a portion of the main passage 200 downstream of the main orifice 202. This valve 208 includes a spool 210 slidably disposed in a valve bore 212. The spool 210 defines within the valve bore 212 a chamber 214 communicating with the servo chamber 50 of the reverse brake 48. A spring 216 is disposed in the valve bore 212 to bias the spool 210 towards a spring set position as illustrated by the right half thereof viewing in FIG. 3. This spool 210 is moveable responsive to pressure build-up within the servo chamber 50 towards a second position as illustrated by the left half thereof viewing in FIG. 3. In the spring set position, the spool 210 closes the bypass passage 206. In the second position as illustrated by the left half of the spool 210 viewing in FIG. 3, the spool 210 opens the bypass passage 206.

For forward drive, the forward clutch 83 is engaged, while the reverse brake 48 is released. Under this condition, the driver and driven frictional plates 112 and 118 are held in firm engagement with each other by the clutch piston 100. Rotation of the input shaft 32 causes the planetary gear set 130 to rotate as a unit since the rotation of the input shaft 32 is transmitted via the clutch drum 82 to the ring gear 128 on one hand and via the clutch drum 82, clutch frictional plate assembly 120 and hub 116 to the sun gear 36 on the other hand. The unitary rotation of the planetary gear set 130 causes the output shaft 18 to rotate in the same direction and speed as the input shaft 32. It should be noted that during operation for forward drive, there is little or no relative rotation which each of the thrust bearings 158, 178 and 180 is to deal with, and there is no relative rotation between the driver and driven frictional plates 112 and 118 of the clutch plate assembly 120. Referring to FIG. 3, since there is no pressure within the chamber 214, the spool 210 of the bypass valve 208 assumes the spring set position as illustrated by the right half thereof viewing in FIG. 3, closing the bypass passage 206. Thus, the supply of lubrication oil to the oil supply passage 182 is determined by the main orifice 202.

For reverse drive, the forward clutch 83 is disengaged, while the reverse brake 48 is applied. The driver and driven frictional plates 112 and 118 of the clutch plate assembly 120 are disengaged owing to the action of the clutch return springs 108. The driver and driven frictional plates 72 and 70 of the brake plate assembly 74 are held in firm engagement with each other by the reverse brake piston 46 owing to pressure build-up in the servo chamber 50. Under this condition, the pinion carrier 134 is anchored and thus held stationary with respect to the casing 10. Rotation of the input shaft 32 causes the clutch drum 82 and ring gear 128 ro rotate in the same direction and speed. Since the pinion carrier 134 is held stationary, this rotation of the ring gear 128 causes the sun gear 36 and output shaft 18 to rotate in the opposite reverse direction. It should be noted that during operation for reverse drive, there is a considerable relative rotation which each of the thrust bearings 156, 178 and 180 is to deal with, and there is a considerable relative rotation between the driver and driven frictional plates 112 and 118 of the clutch plate assembly 120. Thus, increased amount of lubrication oil should be supplied to such portions as mentioned above. Referring to FIG. 3, since there is pressure build-up within the chamber 214, the spool 210 of the bypass valve 208 assumes the second position as illustrated by the left half thereof viewing in FIG. 3, opening the bypass passage 206. This causes the auxiliary orifice 204 to play an important role in determining supply of lubrication oil to the supply passage 182. Thus, the supply of lubrication oil to the passage 182 is determined by the addition of an auxiliary supply past the auxiliary orifice 204 to the main supply past the main orifice 202. This results in an increased supply of lubrication oil to the planetary gearing shown in FIG. 1 during operation for reverse drive.

It should be noted that the radial passages 194 with which the sun gear 36 is formed and the radially extending clearance space 162 defined by the hub 116 assure sufficient supply of lubrication oil to the clutch plate assembly 120. It should also be noted that the axial ports 196 provide supply of lubrication oil to the space 164 within the clutch drum 82.

Referring to FIG. 2, it is now explained how the reverse brake 48, planetary gear set 130 and forward clutch 83 are mounted in the casing 10.

The reverse brake piston 46 is inserted into the casing 10 together with the return springs 58. Then, the reverse spring retainer 60 is inserted into the casing 10 and held by the snap ring 62 with respect to the casing 10.

Prior to insertion into the casing 10, the planetary gear set 130, forward clutch 83 and input shaft 32 are assembled to form a pre-assembly.

The clutch drum 84 is coupled with the input shaft 32 with its flange portion 96 engaging in the cutout 94 of the radially protruded portion 92. Then, the flange portion 96 of the clutch drum 84 is fixedly secured by welding to the radially protruded portion 92.

The clutch piston 100 is inserted into the clutch drum 82 together with the return springs 108 and the spring retainer 104 is inserted into the clutch drum 82 and held by the snap ring 106 with respect to the clutch drum 82.

Referring to the clutch plate assembly 120, the dish plate 124, interleaved driver and driven frictional plates 112 and 118, and retaining plate 122 are brought into engagement with the outer cylindrical portion 84 of the clutch drum 82 and held by the snap ring 126 with respect to the clutch drum 82.

The ring gear 128 is brought into engagement with the outer cylindrical portion 84 of the clutch drum 82 and held by the snap ring 132 with respect to the clutch drum 82.

The hub 116 is fixedly secured to the sun gear 36 with the inner periphery 144 of the radially extending annular disc portion 142 engaged in the outer peripheral cutout 152 of the axially protruding portion 150. The sun gear 36 is inserted into the clutch drum 82 with the cylindrical portion 114 brought into engagement with the driven frictional plates 118. The thrust bearing 158 is interposed between the axially protruding portion 150 of the sun gear 36 and the radially protruded portion 92 of the input shaft 32.

The thrust bearing 178 is held in the recessed portion 166 of the sun gear 36. The pinion carrier 134 having the pinions 140 rotatably carried by the spindles 136 is assembled with the ring and sun gears 128 and 36 by bringing the pinions 140 into meshing engagement with the ring and sun gears 128 and 36.

The thrust bearing 180 is held by the radially extending annular disc portion 142 at its axially displaced inner peripheral portion 170.

This pre-assembly of the planetary gear set 130, forward clutch 83 and input shaft 32 is inserted into the casing 10 with the reduced diameter end portion 30 of the input shaft 32 received in the bore 28 of the central boss 26 until the thrust bearing 180 comes into engagement with the ball bearing inner race 22.

After the insertion of the pre-assembly, the reverse brake frictional plate assembly 74 is inserted and held between the cylindrical portion 64 integral with the pinion carrier 134 by the snap ring 80 with respect to the casing 10.

It should be noted that no skilled labour is required in mounting the component parts into the casing 10 since the planetary gear set 130, forward clutch 83 and input shaft 32 are assembled outside the casing 10 and the reverse brake frictional plate assembly 74 is disposed at a portion adjacent to the opening of the casing 10. This opening of the casing 10 is closed upon inserting the stationary sleeve 90 into the annular space defined between the input shaft 32 and the inner cylindrical portion 86 of the clutch drum 82. The thrust bearing 160 is inserted into this annular space prior to the insertion of the stationary sleeve 90.

It should also be noted that the axial span or dimension between the partition 12 of the casing 10 and the annular end portion 88 of the clutch drum 82 has been reduced considerably owing to arrangement of the clutch drum 82 within and received by the cylindrical portion 64 of the reverse brake 48.

It is readily understood from the preceding description that the change direction planetary gearing thus far described in connection with FIGS. 1 to 3 may find its application in cases where there is a demand for a compact and reliable change direction mechanism between forward and reverse drives. One typical application to a continuously variable transmission is explained in connection with FIG. 4.

Figure 4:
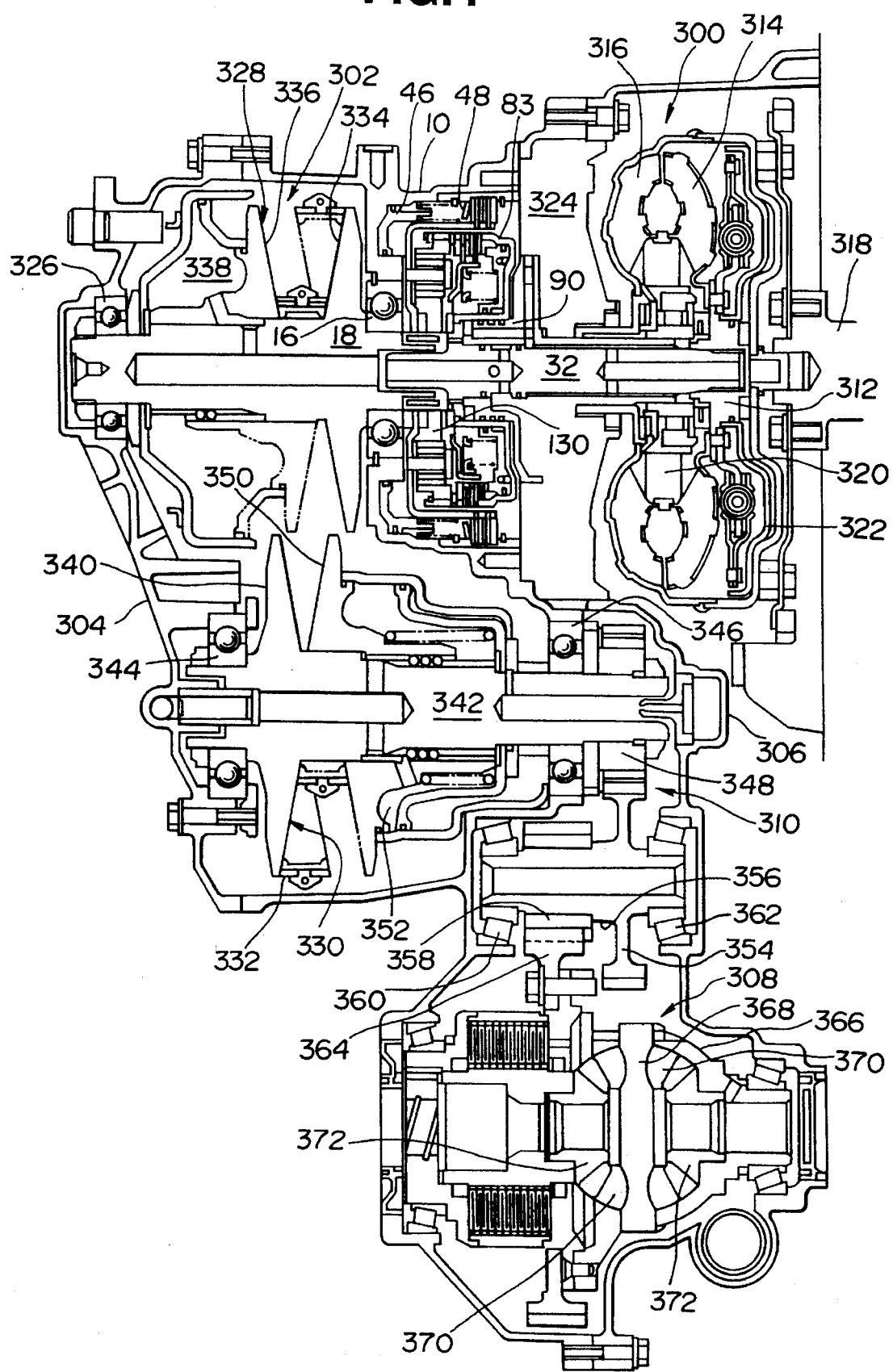
FIG. 4 is a sectional view showing the continuously variable transmission.

The continuously variable transmission shown in FIG. 4 is substantially the same as the known continuously variable transmission disclosed in the before mentioned U.S. Pat. No. 4,735,113, Yamamuro et al. Reference is made to this United States Patent in understanding the detail of the mechanism of and control for the continuously variable transmission.

As different from the known continuously variable transmission, a hydrokinetic torque transmitting unit in the form of a torque converter 300 is used instead of a fluid coupling and the planetary gearing thus far described is used.

Referring to FIG. 4, the same reference numerals as used in FIGS. 1 to 3 are used to denote the corresponding parts or portions. As will be readily understood from FIG. 4, the casing 10 serves, not only as a container for the component parts of the planetary gearing, but also as a container for a continously variable ratio change unit 302 in cooperation with an end cover 304. In cooperation with a converter housing 306, the casing 10 serves as a container for a differential 308 and a gear train 310 drivingly disposed between the continuously variable ratio change unit 302 and differential 308.

As viewed in FIG. 4, the input shaft 32 of the planetary gearing, extending through the stationary sleeve 90, is splined at its righthand end to a turbine hub 312 of a turbine runner 314 of the torque converter 300. The torque converter 300 includes, in addition to the turbine runner 314, a pump impeller 316 drivingly connected to an engine crankshaft 318, a stator 320, and a lock-up piston 322. In the conventional manner, the pump impeller 316 is drivingly connected to a pump housed in a pump cover 324. The pump cover 324 includes the stationary sleeve 90.

As viewed in FIG. 4, the output shaft 18 of the planetary gearing, rotatably supported by the ball bearing 16 on the partition 12, extends into the end cover 304 and has its lefthand end portion rotatably supported by a ball bearing 326 on the end cover 304.

The continuously variable ratio change unit 302 includes a driver pulley 328, a follower pulley 330 and a V-belt 332 interconnecting the drive and follower pulleys 328 and 330. The driver pulley 328 includes an axially stationary conical disc 334 integral with and extending radially outwardly from the output shaft 18, and an axially moveable conical disc 336 slidably mounted on the output shaft 18. The axially moveable conical disc 336 is mounted for rotation with the output shaft 18 and arranged in opposed relationship with the axially stationary conical disc 334 and defines a V-shaped pulley groove. The axially moveable conical disc 336 is displaceable in axial direction of the output shaft 18 in response to an increase in fluid pressure within a driver pulley servo chamber 338 from a first limit position as illustrated by the fully drawn line in FIG. 4 to a second limit position as illustrated by the phantom line in FIG. 4. The follower pulley 330 includes an axially stationary conical disc 340 integral with and radially extending outwardly from a follower shaft 342. As viewed in FIG. 4, the follower shaft 342 has a lefthand end portion rotatably supported by a ball bearing 344 on the end cover 304 and has a righthand end portion rotatably supported by a ball bearing 346 on the casing 10. The follower shaft 342 extends in parallel relationship with respect to the output shaft 18 and extends beyond the ball bearing 346 further into the converter housing 306 to fixedly carry a driver gear 348 of the gear train 310.

The follower pulley 330 includes, in addition to the axially stationary conical disc 340, an axially moveable conical disc 350. The axially moveable conical disc 350 is slidably mounted on the follower shaft 342 although it is mounted for rotation with the follower shaft 342. The axially moveable conical disc 350 is arranged in opposed relationship with the axially stationary conical disc 340 to define a V-shaped groove. The axially moveable conical disc 350 is biased towards the axially stationary conical disc 340 in response to fluid pressure within a follower pulley servo chamber 352. The V-belt 332 is gripped between the conical discs 340 and 350 with a force proportional to load on the engine and speed ratio accomplished by the driver and follower pulleys 328 and 330. The fluid pressure within the follower pulley servo chamber 340 is variable with the engine load and the speed ratio. When the axially moveable conical disc 336 of the driver pulley 328 assumes the first position as illustrated by the fully drawn line in FIG. 4, the axially moveable conical disc 350 of the follower pulley 330 stays in a position as illustrated by the fully drawn line in FIG. 4. Increasing the fluid pressure within the driver pulley servo chamber 338 causes the axially moveable conical disc 336 to move towards the second position as illustrated by the phantom line in FIG. 4. This movement of the conical disc 336 causes the V-belt 332 to move radially outwardly from the output shaft 18 and radially inwardly towards the follower shaft 342. This radially inward movement of the V-belt 332 causes the V-belt 332 to separate the axially moveable conical disc 350 from the axially stationary conical disc 340. Thus, owing to the tension of the V-belt 332, the axially moveable conical disc 336, the axially moveable conical disc 350 moves from a position as illustrated by the fully drawn line in FIG. 4 towards a position as illustrated by the phantom line in FIG. 4.

The gear train 310 includes, in addition to the driver gear 348, an idler gear 354 integral with an idler shaft 356, and a pinion 358 rotatable with the idler shaft 356. The idler shaft 356 extends in parallel relationship with the follower shaft 342 and it is rotatably supported by two taper roller bearings 360 and 362. The taper bearings 360 and 362 are mounted on the casing 10 and the converter housing 306, respectively. The driver gear 348 meshes the idler gear 354. Thus, rotation of the follower shaft 342 causes the pinion 358 to rotate. The pinion 358 meshes with a final gear 364.

The differential 308 includes, in addition to the final gear 364, a differential casing 366 rotatable with the final gear 364, a pinion shaft 368 rotatable with the differential casing 366, a pair of pinions 370 rotatably supported by the pinion shaft 368, and a pair of side gears 372 meshing the pinions 370.

What is claimed is:

1. A planetary gearing, comprising:

a casing;

a brake including a cylindrical portion;

a clutch including a clutch drum received in said cylindrical portion; and a planetary gear set received in said cylindrical portion and connected between said clutch drum and said cylindrical portion wherein said planetary gear set includes a pinion carrier integral with and thus including said cylindrical portion and a ring gear connected in an axially fit manner to said clutch drum, and a sun gear.

2. A planetary gearing as claimed in claim 1, wherein said planetary gear set includes a plurality of pinions rotatably carried by said pinion carrier, each of said plurality of pinions meshing with said ring and sun gears.

3. A planetary gearing as claimed in claim 2, wherein said clutch is operable to connect said sun gear to said clutch drum.

4. A planetary gearing, comprising:

a casing;

a brake including a cylindrical portion;

an output shaft rotatably supported by said casing;

a clutch including a clutch drum received in said cylindrical portion;

an input shaft connected to said clutch drum; and a planetary gear set received in said cylindrical portion, said planetary gear set including a ring gear connected in an axially fit manner to said clutch drum, a sun gear connected to said output shaft, and a pinion carrier, said pinion carrier being integral with said cylindrical portion.

5. A planetary gearing as claimed in claim 4, wherein said pinion carrier includes an annular disc portion having an inner periphery and an outer periphery connected to said cylindrical portion.

6. A planetary gearing as claimed in claim 5, further comprising:

a ball bearing disposed between said output shaft and said casing.

7. A planetary gearing as claimed in claim 6, wherein said annular disc portion is disposed and extends between said bearing and said sun gear.

8. A planetary gearing as claimed in claim 7, wherein said sun gear is formed with a recessed portion and includes a radially extending bottom wall partially defining said recessed portion, and said annular disc portion is offset at a portion radially spaced from said inner periphery thereof to form an axially displaced inner peripheral portion, said axially displaced inner peripheral portion defining on one side a first radially extending wall opposed to said radially extending bottom wall and on the opposite side a second radially extending wall opposed to said ball bearing.

9. A planetary gearing as claimed in claim 8, further comprising:

a first thrust bearing disposed between and in rolling contact with said radially extending bottom wall and said first radially extending wall; and a second thrust bearing disposed between and in rolling contact with said second radially extending wall and said ball bearing.

10. A planetary gearing, comprising:

a casing;

an output shaft rotatably supported by said casing;

a brake including a cylindrical portion;

a clutch including a clutch drum and a cylindrical portion disposed within said clutch drum;

an input shaft connected to said clutch drum;

a planetary gear set including a ring gear connected to said clutch drum, a sun gear connected to said output shaft, and a pinion carrier integral with said cylindrical portion of said brake; and a hub connected to said sun gear and integral with said cylindrical portion of said clutch, said hub defining on one side adjacent to said pinion carrier a radially extending clearance space and on the opposite side a second space within said clutch drum;

said sun gear including means for defining a radial passage having a radially outward end opening to said radially extending clearance space.

11. A planetary gearing as claimed in claim 10, wherein said sun gear includes means for defining an axial port connected to said radial passage and opening to said second space.

* * * * *